United States Patent
Gusenoff et al.

(10) Patent No.: US 12,161,189 B2
(45) Date of Patent: Dec. 10, 2024

(54) ADAPTIVE INSOLE FOR REHABILITATION OF FOOT INJURIES

(71) Applicant: University of Pittsburgh—Of the Commonwealth System of Higher Education, Pittsburgh, PA (US)

(72) Inventors: Jeffrey A. Gusenoff, Pittsburgh, PA (US); Beth R. Gusenoff, Pittsburgh, PA (US); Steven Regis Donahoe, Pittsburgh, PA (US)

(73) Assignee: University of Pittsburgh—Of the Commonwealth System of Higher Education, Pittsburgh, PA (US)

(*) Notice: Subject to any disclaimer, the term of this patent is extended or adjusted under 35 U.S.C. 154(b) by 552 days.

(21) Appl. No.: 17/277,916

(22) PCT Filed: Sep. 20, 2019

(86) PCT No.: PCT/US2019/052174
§ 371 (c)(1),
(2) Date: Mar. 19, 2021

(87) PCT Pub. No.: WO2020/061466
PCT Pub. Date: Mar. 26, 2020

(65) Prior Publication Data
US 2022/0110411 A1    Apr. 14, 2022

Related U.S. Application Data

(60) Provisional application No. 62/734,295, filed on Sep. 21, 2018.

(51) Int. Cl.
A43B 17/03    (2006.01)
A43B 7/142    (2022.01)
(Continued)

(52) U.S. Cl.
CPC .............. *A43B 17/03* (2013.01); *A43B 7/142* (2013.01); *A43B 7/144* (2013.01); *A43B 7/1445* (2013.01); *A43B 17/006* (2013.01)

(58) Field of Classification Search
CPC ...... A43B 17/03; A43B 17/035; A43B 7/1464
See application file for complete search history.

(56) References Cited

U.S. PATENT DOCUMENTS 3,589,037 A * 6/1971 Gallagher .............. A43B 17/03
36/4
3,765,422 A * 10/1973 Smith .................... A43B 17/03
36/153
(Continued)

FOREIGN PATENT DOCUMENTS

DE    102013006837 B4    9/2016
WO    1998056272 A1    12/1998
WO    2018098463 A1    5/2018

OTHER PUBLICATIONS

James Walker Sealing Products and Services. Elastomer Engineering Guide. 2017.

*Primary Examiner* — Megan E Lynch
(74) *Attorney, Agent, or Firm* — The Webb Law Firm

(57) ABSTRACT

An insole for offloading injuries on an area of a plantar surface of a patient's foot includes a body having a shape corresponding to the plantar surface of the patient's foot including a top surface and a bottom surface; and at least one supportive, deformable, deflatable bubble chamber. The at least one bubble chamber extends from the top surface of the body. The at least one bubble chamber is configured to be deflated to relieve pressure on the plantar surface of the patient's foot. A kit including the insole and an article of footwear including a sole, an upper connected about a
(Continued)

periphery of the sole defining an interior of the article of footwear, and the insole positioned in the interior of the article, are also provided.

20 Claims, 11 Drawing Sheets

(51) Int. Cl.
    *A43B 7/144*     (2022.01)
    *A43B 7/1445*     (2022.01)
    *A43B 17/00*     (2006.01)

(56) References Cited

U.S. PATENT DOCUMENTS

| | | | | |
|---|---|---|---|---|
| 3,871,117 | A * | 3/1975 | Richmond | A43B 17/035 36/43 |
| 4,017,931 | A * | 4/1977 | Golden | A43B 17/03 12/146 B |
| 4,112,599 | A | 9/1978 | Krippelz | |
| 4,287,250 | A * | 9/1981 | Rudy | B29C 66/72 206/522 |
| 4,934,070 | A * | 6/1990 | Mauger | A43B 17/035 36/43 |
| 5,768,803 | A * | 6/1998 | Levy | A43B 17/02 36/43 |
| 5,778,561 | A * | 7/1998 | Shimoyama | A43B 1/0045 36/43 |
| 5,894,687 | A * | 4/1999 | Lin | A43B 7/146 36/43 |
| 5,996,254 | A * | 12/1999 | Goven | A43B 17/035 36/43 |
| 6,450,721 | B1 | 9/2002 | D'Amico et al. | |
| 6,599,597 | B1 * | 7/2003 | Bonk | B32B 27/306 428/36.6 |
| 6,730,379 | B2 | 5/2004 | Bonk et al. | |
| 6,872,270 | B2 | 3/2005 | Cho et al. | |
| 6,976,321 | B1 * | 12/2005 | Lakic | A43B 17/006 36/28 |
| 7,451,555 | B1 * | 11/2008 | Lakic | A43B 13/206 36/43 |
| 8,201,346 | B2 | 6/2012 | Darby, II et al. | |
| 9,839,260 | B1 * | 12/2017 | Chang | A43B 17/03 |
| 2004/0003514 | A1 * | 1/2004 | Cole | A43B 7/144 36/43 |
| 2004/0168354 | A1 * | 9/2004 | Nguyen | A43B 13/187 36/43 |
| 2006/0026865 | A1 | 2/2006 | Grisoni et al. | |
| 2007/0074430 | A1 * | 4/2007 | Coomer | A43B 7/143 36/145 |
| 2008/0130401 | A1 | 6/2008 | Belanger et al. | |
| 2008/0229611 | A1 * | 9/2008 | Chiodo | A43B 17/035 36/29 |
| 2009/0019728 | A1 | 1/2009 | Roth | |
| 2009/0056171 | A1 * | 3/2009 | Lin | A43B 7/082 36/29 |
| 2013/0227858 | A1 * | 9/2013 | James | A43B 13/125 36/88 |
| 2013/0232816 | A1 * | 9/2013 | Eadie | A43B 7/149 36/71 |
| 2015/0305436 | A1 * | 10/2015 | Doyle | A43B 17/035 36/43 |
| 2018/0008000 | A1 | 1/2018 | Chanda et al. | |
| 2018/0042342 | A1 | 2/2018 | Kleinsasser et al. | |
| 2018/0255872 | A1 | 9/2018 | Manasiya | |
| 2019/0373984 | A1 | 12/2019 | Wijesundara et al. | |

* cited by examiner

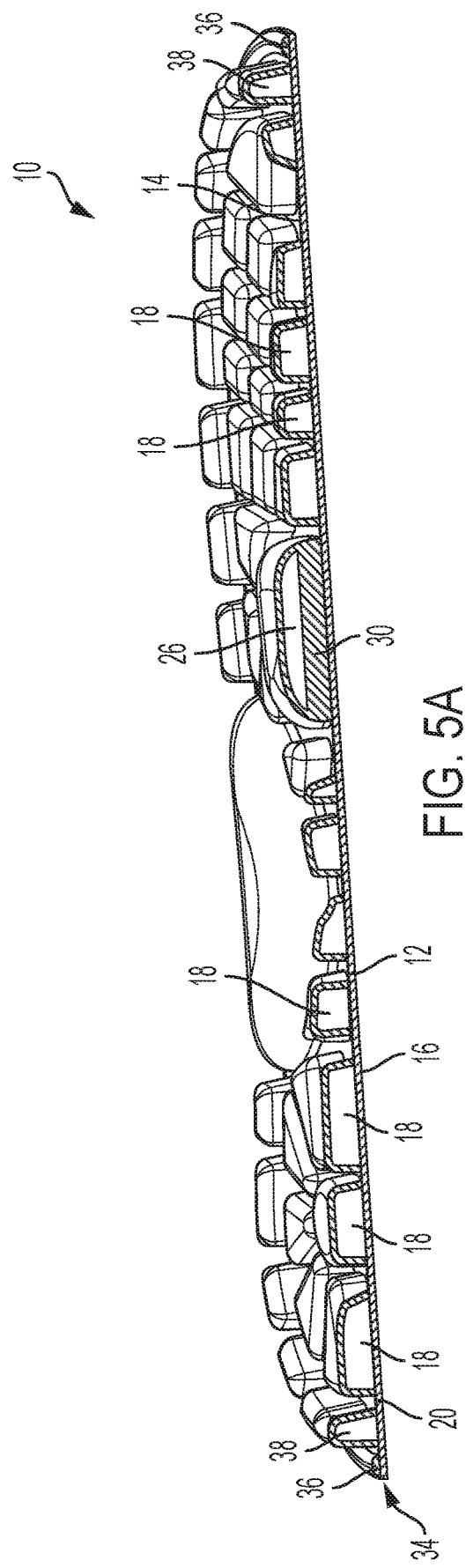

ADAPTIVE INSOLE FOR REHABILITATION OF FOOT INJURIES

CROSS REFERENCE TO RELATED APPLICATIONS

This application is the United States national phase of International Application No. PCT/US2019/052174 filed Sep. 20, 2019, which claims the benefit of U.S. Provisional Patent Application No. 62/734,295, filed Sep. 21, 2018, the disclosures of which are hereby incorporated by reference in their entirety.

STATEMENT REGARDING FEDERAL FUNDING

This invention was made with government support under Grant No. IIP1734751, awarded by the National Science Foundation. The government has certain rights in the invention.

BACKGROUND

Technical Field

The present disclosure is directed to a supportive insole and, in particular, to an insole configured to offload injured tissues on the plantar surface of a patient's foot. The present disclosure is also directed to a kit allowing a user to customize the insole for a particular patient and/or particular tissue injury.

Description of Related Art

Healing of plantar foot injuries, such as post-surgical incisions and grafts, traumatic foot injuries, and/or diabetic foot ulcers may be impaired in ambulatory patients due to pressure on injured tissues on the plantar surface of the foot, as occurs when the patient is walking or standing. A number of devices are available commercially for offloading injuries and/or injured tissues on the plantar surface. For example, the PegAssist™ insole from DARCO International, Inc. of Huntington, West Virginia comprises a flat, ethyl vinyl acetate (EVA) multilayer foam body with removable, hexagonal pegs. Pegs, which would contact the injured tissue, can be removed from the insole, thereby offloading the injury. However, the removable pegs are firm and have sharp contours, which can cause discomfort and/or aggravate existing injuries. Further, the PegAssist™ insole is not anatomically shaped for arch support.

Most other commercially available insoles are generally flat and do not provide offloading of injuries on the plantar surface of the patient's foot. Similarly, post-operative shoes, like the DARCO product, are bulky, flat, and do not completely offload grafted areas. Also, most commercially available insoles cannot be worn in the shower.

In view of the deficiencies of presently available options, there is a need for an insole device that effectively offloads plantar injuries, is non-bulky, is simple to use, can be easily cleaned, and can be worn in a shower or other wet areas. The insole device, kit, and methods of use disclosed herein are intended to address such issues.

SUMMARY

According to an aspect of the disclosure, an insole for offloading injuries on an area of a plantar surface of a patient's foot includes a body having a shape corresponding to the plantar surface of the patient's foot including a top surface and a bottom surface; and at least one supportive, deformable, deflatable bubble chamber. The at least one bubble chamber extends from the top surface of the body. The at least one bubble chamber is configured to be deflated to relieve pressure on the plantar surface of the patient's foot.

According to another aspect of the disclosure, a kit including an insole, such as the insole described previously, is provided.

According to another aspect of the disclosure, an article of footwear includes a sole including a top surface and a bottom surface, an upper surface connected about a periphery of the top surface of the sole defining an interior of the article of footwear, and an insole. The insole can be any of the insoles described herein. The insole is positioned in the interior of the article of footwear with the bottom surface of the insole contacting the top surface of the sole.

According to another aspect of the disclosure, a method of relieving pressure on a portion of a plantar surface of a foot of a patient includes: placing an insole, such as any of the previously described insoles, in an article of footwear; deflating at least one bubble chamber of the insole, wherein the at least one bubble chamber is located at a position on the insole corresponding to the portion of the patient's foot requiring pressure relief; and positioning the patient's foot in the article of footwear. Particularly, the patient's foot should be positioned such that the portion of the patient's plantar surface in need of pressure relief is over the deflated bubble chamber.

BRIEF DESCRIPTION OF THE DRAWINGS

The Figures provide exemplary and illustrative aspects of the invention as described herein, and are not intended to be limiting. Further, the drawings are schematic in nature, and for ease of illustration, certain elements depicted in the figures are not necessarily drawn to scale.

FIG. 5A is a cross-sectional view of the insole of FIG. 2 taken along line 5A-5A (shown in FIG. 3);

DETAILED DESCRIPTION

Figure 1:
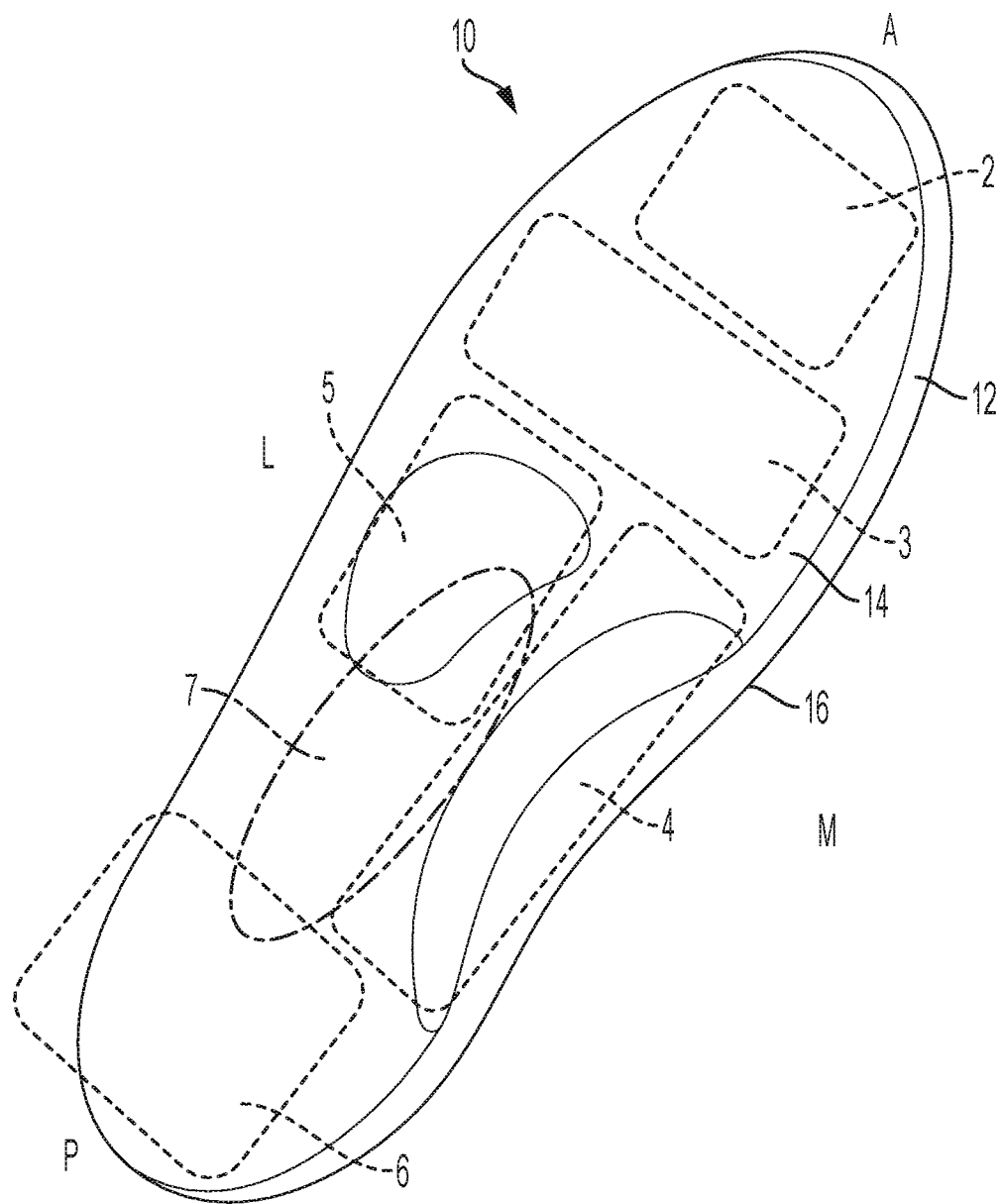
FIG. 1 is a plan view of an insole, showing various portions thereof.
Figure 2:
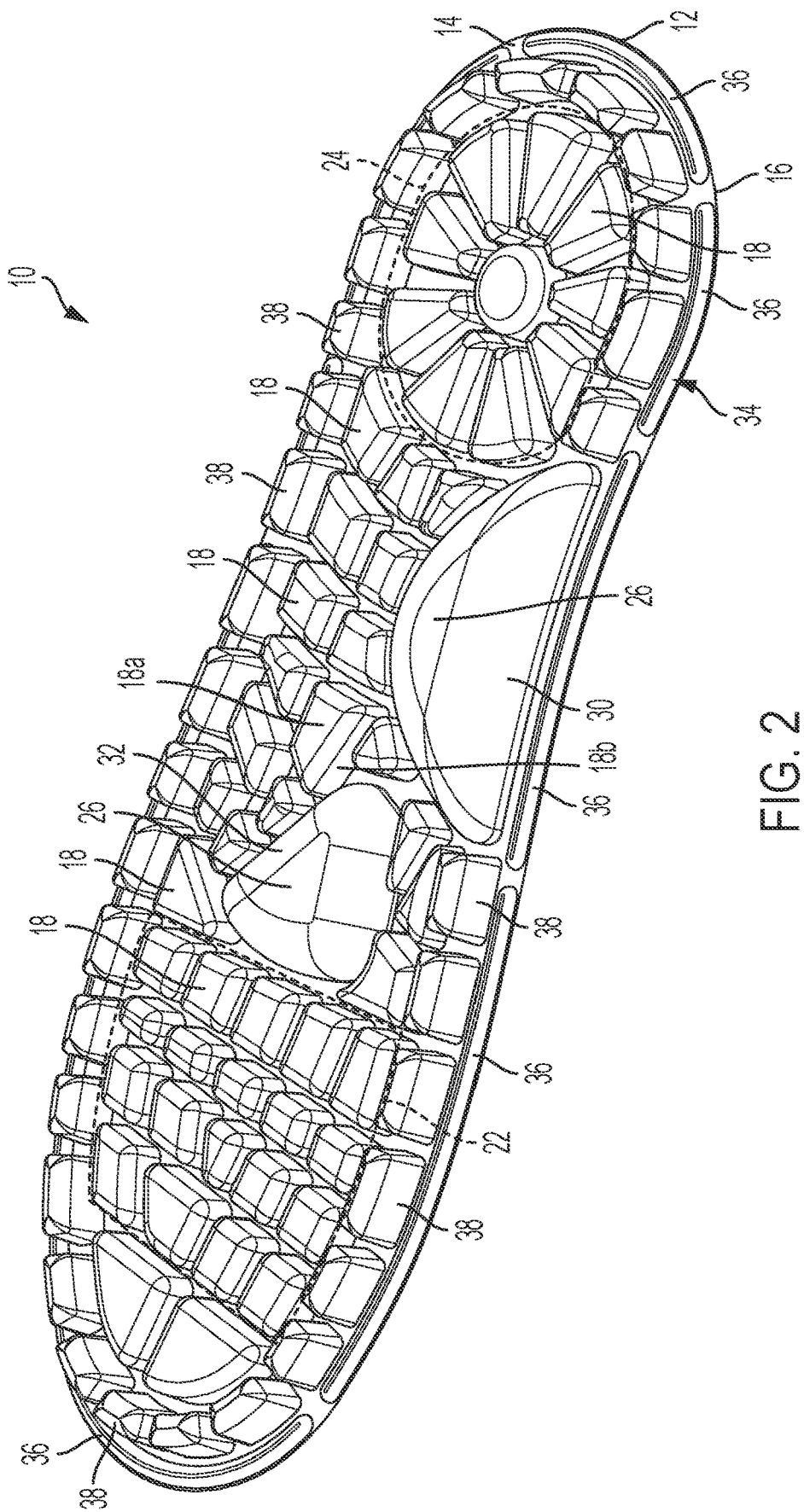
FIG. 2 is a perspective view of an insole for offloading injuries on an area of a plantar surface of a patient's foot, according to an aspect of the disclosure.
Figure 3:
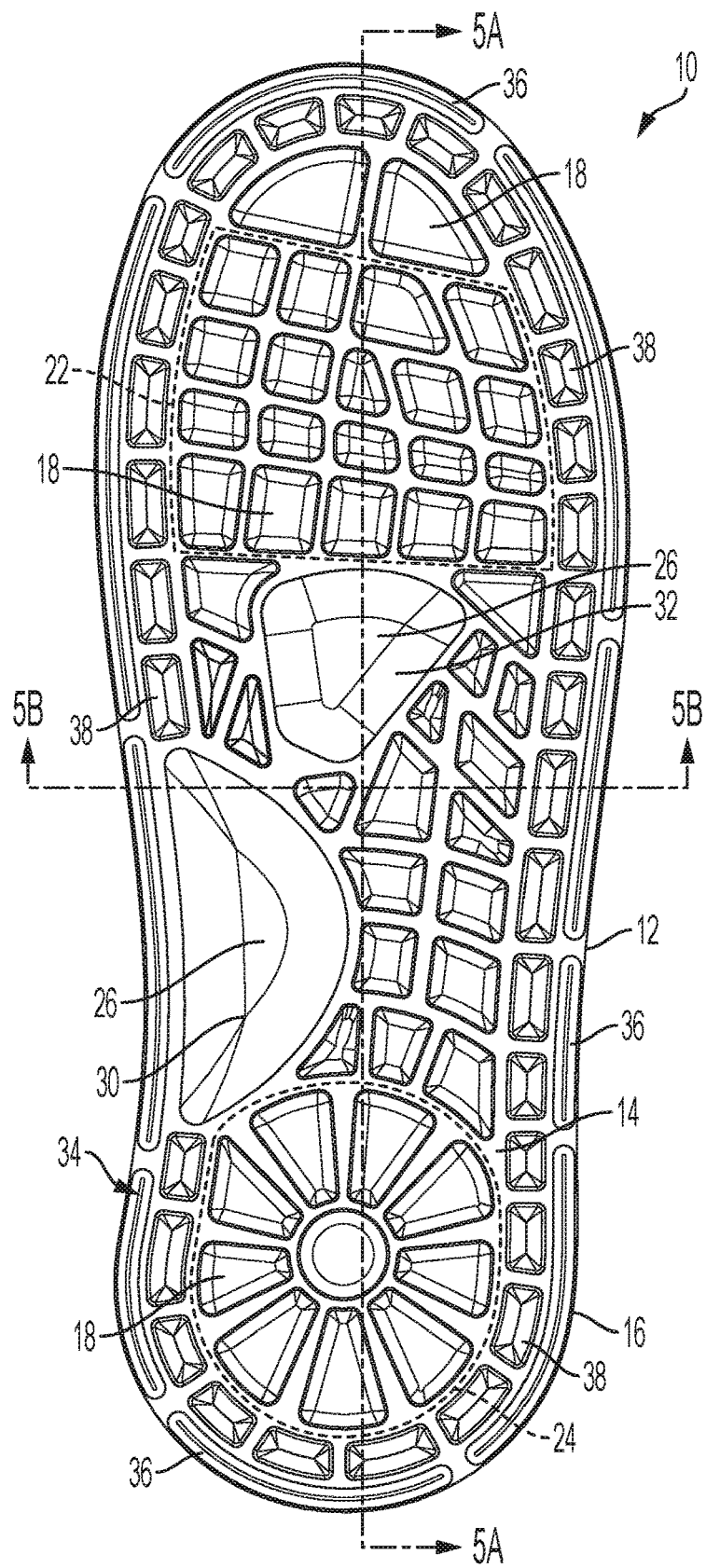
FIG. 3 is a top view of the insole of FIG. 2.
Figure 4:
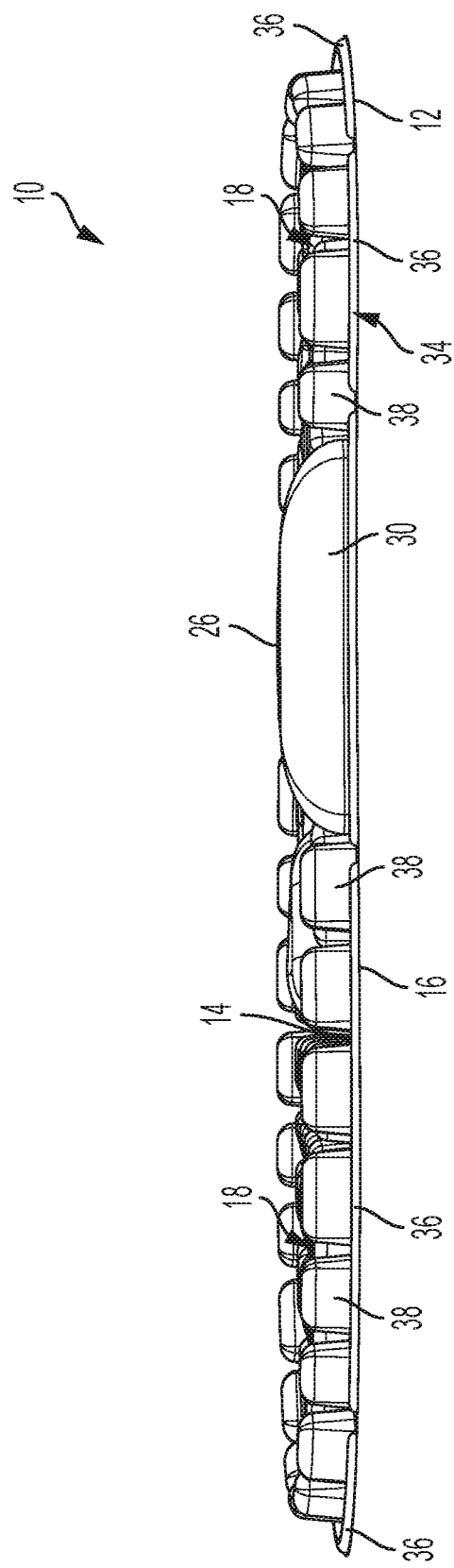
FIG. 4 is a side view of the insole of FIG. 2.
Figure 5B:
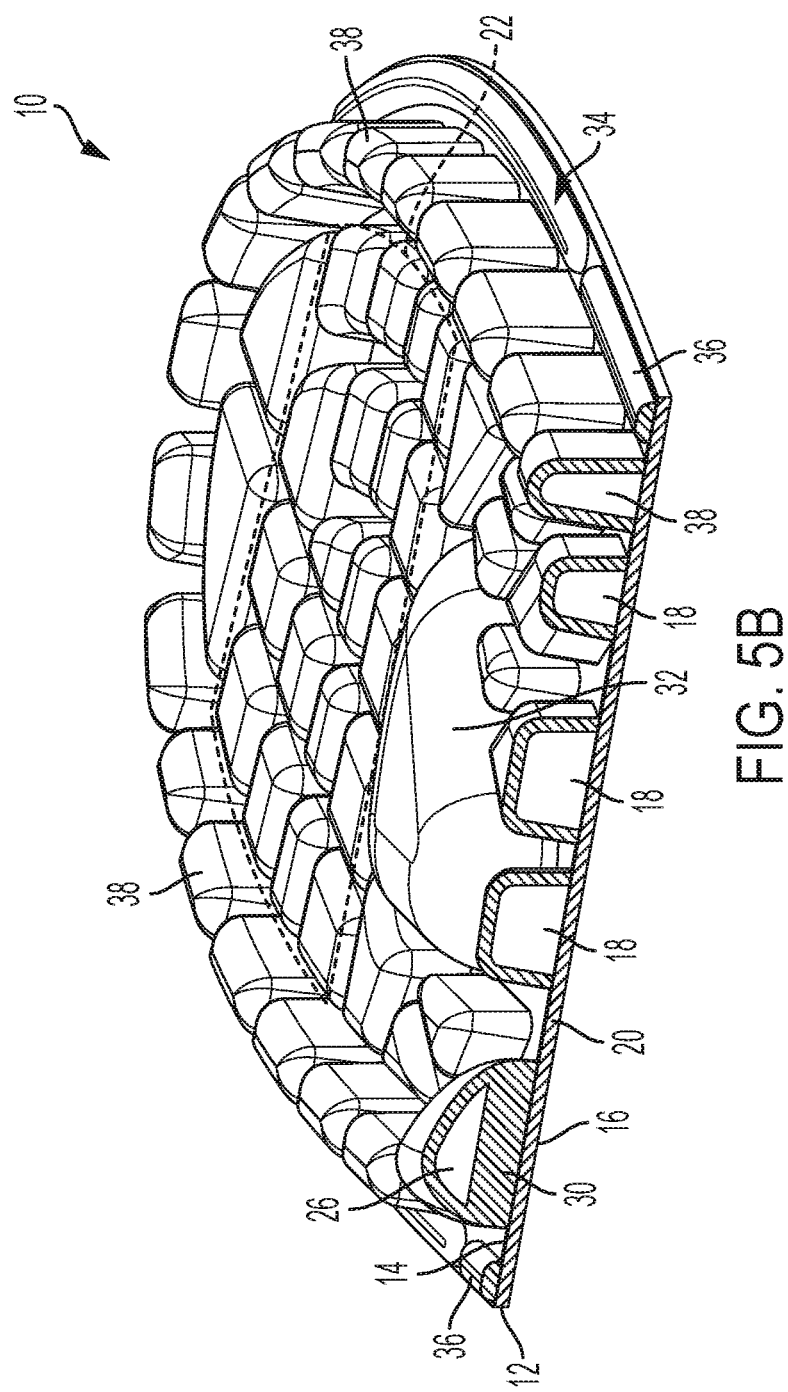
FIG. 5B is a cross-sectional view of the insole of FIG. 2 taken along line 5B-5B (shown in FIG. 3)

The use of numerical values in the various ranges specified in this application, unless expressly indicated otherwise, are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of these ranges is intended as a continuous range including every value between the minimum and maximum values.

As used herein, the terms "comprising," "comprise" or "comprised," and variations thereof, are meant to be open ended. The terms "a" and "an" are intended to refer to one or more.

As used herein, the "treatment" or "treating" of a condition, wound, or defect means administration to a patient by any suitable dosage regimen, procedure and/or administration route of a composition, device or structure with the object of achieving a desirable clinical/medical end-point.

As used herein, the term "patient" or "subject" refers to members of the animal kingdom including but not limited to human beings and "mammal" refers to all mammals, including, but not limited to human beings.

As used herein stating that a layer is said to be disposed "over" a referenced layer, or "about a circumference of" a referenced layer, or "about at least a portion of the circumference of" a referenced layer, does not imply the layer is directly adjacent to the referenced layer, and may comprise one or more additional layers therebetween, and further does not imply that the layer completely covers the referenced layer, and may only cover, surround, contact, etc., only a portion of the referenced layer. That said, if a layer is said to be disposed "directly about" or "directly over" a referenced layer, it is meant the two layers contact each other, though an intermediary layer, such as an adhesive layer, or a blended layer that results from directly contacting the two layers during the process of formation of the device may be present between the two stated layers. Also, if a layer is said to "completely cover" a referenced layer, it is meant the second layer covers the entirety of the referenced layer. Stating that a layer is said to be disposed "over" another layer, or "about a circumference of" a referenced layer, or "about at least a portion of the circumference of" a referenced layer includes where the stated layers are directly contacting each other and/or that the layer completely covers the referenced layer.

Insole for Offloading Plantar Injuries

With reference to the figures, an insole 10 for offloading an injury on an area of a plantar surface of a patient's foot includes a body 12 having a shape corresponding to at least a portion of the plantar surface of the patient's foot. The body 12 comprises a top surface 14 and a bottom surface 16. The insole 10 further comprises at least one supportive, deformable, deflatable bubble chamber 18 extending from the top surface 14 of the body 12. The at least one bubble chamber 18 is configured to be deflated to relieve pressure on the plantar surface of the patient's foot.

The at least one bubble chamber 18 is positioned on the insole for offloading injuries to specific anatomical regions of the patient's foot. For example, the at least one bubble chamber 18 can be positioned at a metatarsal portion or at a heel or calcaneus bone portion of the insole 10 to relieve pressure from the metatarsal portion or heel portion of the patient's foot. As used herein, the "portion of the insole" for a specified anatomical structure refers to the portion of the insole 12 located under and/or that would be contacted by the anatomical structure of the patient's foot when the insole 10 is in use. Further, as used herein, the specified anatomical structure on the patient's foot refers to a position on an opposite side of the patient's skin to the stated anatomical structure, such as a bone, ligament, tendon, or plantar fascia. For example, the metatarsal portion of the foot refers to the area of the patient's skin on the plantar surface opposite the metatarsal bones of the foot. However, reference to anatomical structures of the foot and anatomical directions, such as anterior, posterior, axial, or medial, as well as references to position relative to a user of the product, such as distal and proximal, are merely used to describe the relative orientation, configuration, adaptation, and arrangement of elements of the insole 10. Such anatomical and directional terms are not intended to be otherwise limiting. For example, specified anatomical structures and directions are not intended to require a fixed, spatial orientation of the insole 10, such as relative to a specific patient or end user of the device.

In some examples, the bubble chambers 18 are configured to be partially or fully deflatable to offload the injured tissues, thereby relieving pressure to the injured tissues on the patient's foot. For example, as described in further detail herein, a bubble chamber 18 can be pierced or punctured to evacuate fluid (e.g., gas or suitable liquids) from the bubble chamber 18 to deflate and decrease a height of the bubble chamber 18. Generally, one or more bubble chambers 18 can be pierced or punctured on portions of the insole 10 corresponding to injured portions of the patient's foot. Accordingly, deflated bubble chambers 18 do not contact or have reduced contact with the injured tissues compared to when the chamber 18 is inflated, thereby relieving the pressure from the injured tissues. For example, for a patient having an injury on the metatarsal portion of the plantar surface of the foot, bubble chambers 18 on the metatarsal portion of the insole 10 can be deflated to offload the injury and to protect the injured portions of the patient's foot.

The bubble chambers 18 can be positioned to treat injuries to many different regions of the foot. FIG. 1 is a schematic drawing of the insole 10 showing relative position for a number of different regions of the foot that can be treated using the insole 10. It is noted, however, that FIG. 1 is schematic in nature and that the illustrated portions are merely exemplary of an insole 10 in accordance with the present disclosure. A person skilled in the art can modify the insole 10 to treat different regions of the plantar surface and/or to relieve pressure to different regions of the patient's foot. As shown in FIG. 1, the insole includes an anterior end portion A, a posterior end portion P, a lateral side portion L, and a medial side portion M. The insole also includes a toe portion 2, a distal metatarsal head portion 3, a medial arch portion 4, a metatarsal (or anterior transverse arch) portion 5, and a heel (or calcaneus) portion 6. The insole 10 also includes a plantar fascia insertion and tendon portion 7, which is depicted overlapping the depicted heel portion 6, metatarsal portion 5, and medial arch portion 4. Bubble chambers 18, as well as other supportive structures described herein, can be positioned at any of the insole portions 2, 3, 4, 5, 6, 7 to provide specific treatment and offloading of injuries for specified areas of the patient's foot.

With specific reference to FIGS. 2-5B, the body 12 of the insole 10 is a substantially planar structure comprising the top surface 14 and the opposing bottom surface 16. The body

12 may be from about 1 mm to about 25 mm (0.05 inch to about 1.0 inch) thick. The body 12 can be configured or adapted to fit within and/or be integrally formed with a footwear article. For example, the body 12 can be about 20 cm to 30 cm (about 7.8 inches to 11.8 inches) long and about 9 cm to about 13 cm (about 3.5 inches to 5 inches) wide. As used herein, a "footwear article" can include a shoe, boot, sandal, slide, or other structure to be worn at least over the sole of a foot, and having the general shape of the sole of a foot. The insole 10 can also be integrated into a sock, stocking, compression sleeve, or similar wearable article.

The insole 10 and footwear articles described herein may be configured for the left foot or the right foot of a patient. Further, the insole 10 may be provided in standard sizes, such as small, medium, large, or extra-large sizes, using standard size cutoffs, or in a "one size fits all" size with multiple cutaway ridges as illustrated herein.

In some examples, the body 12 of the insole 10 is fabricated from one or more elastomeric layers, which can be connected and/or laminated together to form a substantially unitary structure. The elastomeric layers can comprise any elastomeric polymer composition that can be adapted to be used for the purposes described herein. Elastomeric materials can be selected giving consideration to one or more physical parameters of the insole 10 including tensile strength, elongation at break, resilience, elasticity (e.g., modulus), impermeability to the fluid (e.g., gas or liquid) contained within the bubble chambers 18 of the insole 10, and/or lack of toxicity (non-toxic, non-inflammatory, and/or non-irritating). Material properties of selected polymer composition(s) desirably fall within acceptable values for each physical parameter, such that any combination of physical parameters yield an insole 10 able to function as described herein. Choice of polymer composition, the method of forming the composition (e.g., molding, 3D printing, etc.), thickness of the insole body 12, thickness of walls of the bubble chambers 18, the size and shape of the bubble chambers 18, the placement of the bubble chambers 18, and methods of testing suitable polymer compositions for use in the insole 10 described herein, are within the abilities of a person of ordinary skill in the art (see, e.g., "Elastomer Engineering Guide" James Walker Sealing Products and Services Ltd 2017). In some examples, as shown in FIGS. 2-5B, a height of the bubble chambers 18 (e.g., a vertical distance between the top surface 14 of the body 12 and the top of the bubble chamber 18) may be different for different groups of bubble chambers 18 of the insole 10. For example, bubble chambers 18 configured to contact the arch, metatarsal pad, or peripheral portions of the patient's foot may be higher than bubble chambers 18 on other portions of the insole 10. Further, topography of the insole 10 may vary or be customized for patients of different heights, weights, activity levels, and other physical characteristics.

As used herein, the term "polymer composition" is a composition comprising one or more polymers. As a class, "polymers" includes homopolymers, heteropolymers, co-polymers, block co-polymers, and can be both natural and synthetic. Homopolymers contain one type of building block, or monomer, whereas co-polymers contain more than one type of monomer. The term "(co)polymer" and like terms refer to either homopolymers or copolymers. A polymer "comprises" or is "derived from" a stated monomer if that monomer is incorporated into the polymer. Thus, the incorporated monomer (monomer residue) that the polymer comprises is not the same as the monomer prior to incorporation into a polymer, in that at the very least, certain groups (e.g., functional/active groups or leaving groups) are missing and/or modified when incorporated into the polymer backbone. A polymer is said to comprise a specific type of linkage if that linkage is present in the polymer.

As indicated previously, the choice of polymer composition useful in preparation of the insole described herein is limited to polymer compositions having suitable physical characteristics for use in an insole 10 to function as described herein, including strength, flexibility, resilience, deformability, etc., and are not limited by the specific examples of useful polymer types and compositions listed below. Useful polymer compositions can have any topology, including linear, star, comb, dendrimer, etc., as are broadly-known, and can be cross-linked, as is broadly-known, so long as the crosslinked polymer composition has suitable physical characteristics. Useful polymer compositions include, without limitation: thermoplastic polymer compositions, homopolymers, copolymers, and block copolymers. Non-limiting examples of polymer compositions include: polyolefins, polyurethanes, polyesters, silicone (e.g., silicone rubbers), and siloxanes. Specific, non-limiting examples of polymer compositions include: polyalkylenes, such as polyethylene, polypropylene, polyvinyl chloride, and thermoplastic polyurethanes, such as, for example and without limitation, block polyurethane copolymers with polyester, polyether, or polycarbonate segments, such as Desmopan® (Covestro) or Elastollan® (BASF) polymer compositions.

In some examples, the body 12 of the insole 10 further comprises one or more additional coating layers 20 (shown in FIGS. 5A and 5B) on its exterior, such as a layer of a silicone or other suitable cushioning polymeric material. The additional coating layers 20 may cover one major surface (e.g., the top surface 14) of the body 12 of the insole 10, both major surfaces (e.g., the top surface 14 and the bottom surface 16) of the body 12, or the entire surface and sides of the insole 10, and may be of any suitable thickness so long as it does not interfere with operation of the insole 10. For example, the additional coating layers 20 can be from 0.1 mm to 2 mm thick.

With continued reference to FIGS. 2-5B, in some examples, the bubble chambers 18 are configured to be supportive, deformable, and deflatable. By "supportive, deformable, deflatable bubble chambers," it is meant sealed chambers being "deformable" by virtue of having walls made from a flexible, elastic, and/or resilient material and filled with a fluid, such as a gas or a suitable liquid. The bubble chambers 18, in aggregate, support a patient's weight, and are, therefore, "supportive." Further, the deformable, flexible, elastic, and/or resilient nature of the bubble chamber 18 results from compression of the fluid (e.g., gas within the chamber) and/or flexion and expansion of side walls of the bubble chamber 18. Under the weight of a patient, the chamber 18 is flattened, and thereby shortened in height, resulting in an increase in the diameter of the chamber 18. The fluid (e.g., gas) can be released from the chamber 18 by piercing the wall of the bubble chamber 18, thereby "deflating" the chamber 18, as in popping a bubble.

In some examples, the bubble chambers 18 are spaced apart (as shown in FIGS. 2-5B) so that when no pressure is applied to the insole 10, the bubble chambers 18 do not touch. When pressure is applied to the insole 10, adjacent bubble chambers 18 may or may not touch. It should be noted that all or some of the bubble chambers 18 of the insole 10 may be spaced apart. It further should be appreciated by those of ordinary skill in the field of the disclosure that the layout of the bubble chambers 18 in the insole may be optimized based on a variety of criterion, such as: foot size, bubble size, patient weight, aesthetics, support of bubble chambers 18 adjacent to deflated chambers, materials used to make the bubble chambers 18, the fluid filling the bubble chambers 18, the location of the bubble chambers 18 in the insole 10 relative to a patient's foot, and/or the location of an injury on a plantar foot surface, among other variables.

In some examples, one or more bubble chambers 18a, 18b (shown in FIG. 2) can be stacked on top of one another to provide greater flexibility in adjusting a height of different portions of the insole 10. For example, a plurality of outermost bubble chambers 18a may be stacked on (e.g., connected to an outwardly facing surface of) a larger inner bubble chamber 18b. A user may deflate one or more of the outermost bubble chambers 18a, while leaving the larger inner bubble chamber 18b intact. Alternatively, if there is a need to fully offload an injury from a particular portion of the insole 10, the user could deflate the larger inner bubble chamber 18b, which would substantially reduce a height of the portion of the insole 10.

FIGS. 2-5B show an example of the insole 10 of the present disclosure including the body 12 and the at least one bubble chamber 18. As shown in FIGS. 2-5B, the insole 10 comprises a plurality of bubble chambers 18 of different sizes and shapes positioned to support different portions of the patient's foot. The bubble chambers 18 can have any size, shape, or pattern in the insole 10, so long as they are consistent with the use of the insole 10 as described herein. The insole 10 may comprise any number of bubble chambers 18 arranged in linear rows and/or columns. For example, each row of bubble chambers 18, moving from the anterior end to the posterior end of the insole 10, may comprise from one to twenty-five bubble chambers 18. Further, some of the bubble chambers 18 are depicted as being arranged in a linear grid 22. Some of the bubble chambers 18 are in a circular pattern 24 for providing support for the patient's heel. However, the bubble chambers 18 can be arranged in any effective pattern. The number of bubble chambers 18 used in the insole 10 can depend, for example, on the support needed in each anatomical portion of the insole 10, including support from adjacent bubble chambers 18 needed when one or more bubble chambers 18 are deflated. In particular, bubble chambers 18 can be positioned in a distal metatarsal head portion of the insole 10 to relieve pressure on at least a portion of the plantar surface of the patient's foot over a distal metatarsal head bone. Bubble chambers 18 can also be positioned in a heel or calcaneus bone portion of the insole 10 to relieve pressure on at least a portion of the heel or the patient's foot over the calcaneus bone or at a plantar fascia portion of the insole 10 to relieve pressure on the plantar fascia of the patient's foot.

Figure 6A:
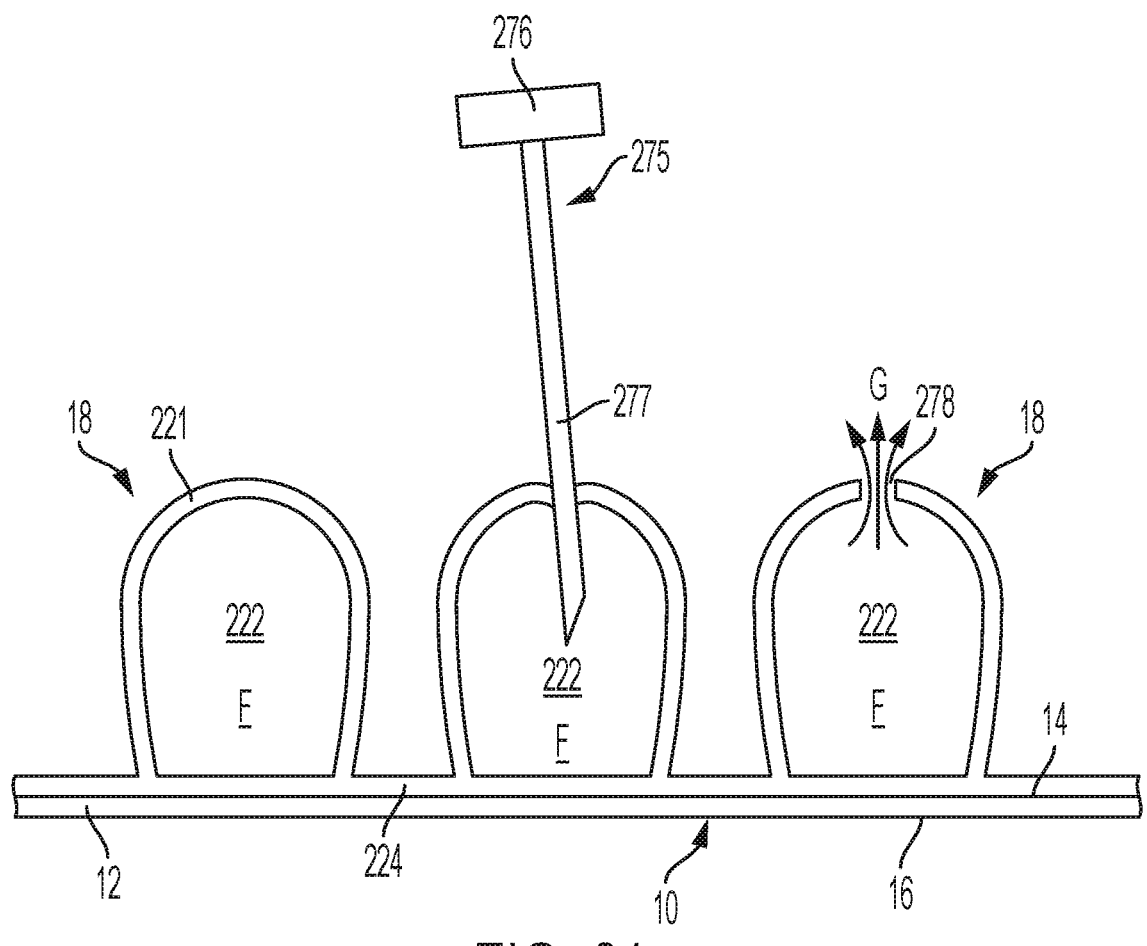
FIG. 6A is a schematic cross-sectional view of portions of the insole of FIG. 2 showing a device for deflating one or more of the bubble chambers.
Figure 6B:
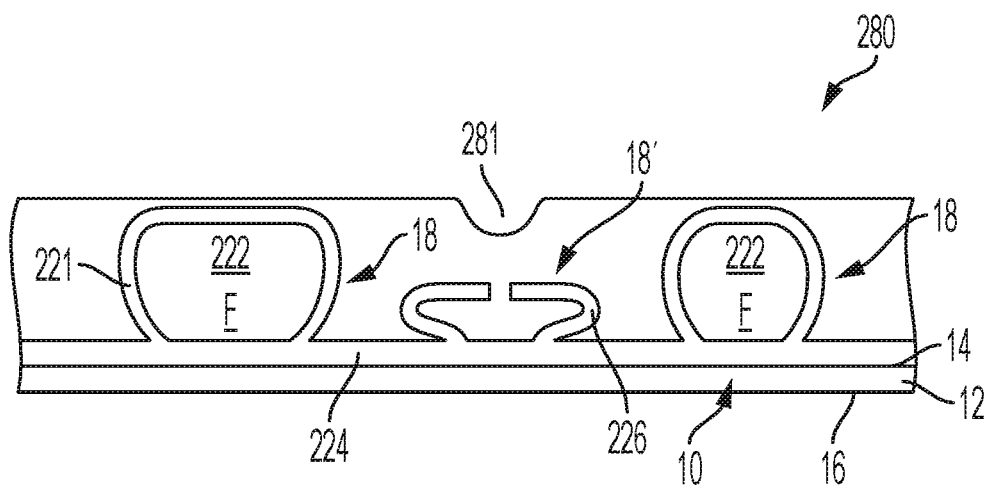
FIG. 6B is a schematic cross-sectional view showing the insole of FIG. 2 in use and wherein one of the bubble chambers is deflated.

FIGS. 6A and 6B depict schematic drawings showing cross-sectional views of portions of the insole 10, while the insole 10 is being prepared for use by deflating certain bubble chambers 18 (see FIG. 6A) and in use supporting a patient's foot (see FIG. 6B). As shown in FIGS. 6A and 6B, bubble chambers 18 comprise a wall 221 enclosing a chamber 222 filled with a fluid F. For example, bubble chambers 18 can be filled with a gas comprising, for example and without limitation, air or compressed air (>1 atmosphere). In other examples, the bubble chambers 18 can be filled with a liquid. The bubble chambers 18 further comprise an insole membrane 224 connecting the bubble chambers 18 and other features of the insole 10. Also depicted is a piercing device 275, having a handle 276 and a hollow needle 277, e.g., the needle portion of a hypodermic needle, that is used to "pop" the bubble chamber 18 by piercing the wall 221 of the bubble chamber 18 such that the fluid escapes from the bubble chamber 18 through a hole 278, as depicted by the arrows G. The insole membrane 224 may be the same material as the material of the bubble chambers 18, or may be different, such as a multi-layer laminate structure, as is appropriate.

FIG. 6B depicts a cross-section of a portion of the insole 10, essentially as shown in FIG. 6A, including the plurality of bubble chambers 18, showing the wall 221 and chamber 222 filled by the fluid F, an insole membrane 224, and including a deflated bubble chamber 18'. A portion of a foot 280 with a wound 281 is shown resting on the insole 10 compressing the bubble chambers 18, while not contacting, or optionally, lightly contacting, the deflated chamber 18'. The bubble chambers 18 are supportive enough so that they do not compress under body weight such that the deflated chamber 18' presses on or presses significantly on the wound 281.

With reference again to FIGS. 2-5B, in some examples, the insole 10 further comprises one or more rigid and/or solid support members, such as an arch support 30 located at the medial arch portion of the insole 10 and a metatarsal support 32 located at the metatarsal portion of the insole 10. The supports 30, 32 extend from the top surface 14 of the body 12 and can comprise a rounded or concave surface sized to support the patient's foot. The supports 30, 32 may independently comprise a single support, such as a support molded from a polymer or thermoplastic material, or multiple layered supports stacked on top of one another.

The supports 30, 32 may be formed from a thermoplastic material. The supports 30, 32 may also be formed from suitable foams (e.g., an ethylene vinyl acetate (EVA) foam), gels, and/or elastomers, as are known in the art, to form a substantially rigid and/or solid structure capable of supporting the plantar surface of the foot. In some examples, the arch support 30 and/or the metatarsal support 32 comprise a bubble chamber 26, similar in structure and function to the previously described bubble chambers 18, so that a height of the supports 30, 32 can be adjusted. Where the arch support 30 and/or the metatarsal support 32 comprise a bubble chamber 26, the bubble chamber 26 may be independently deflatable to allow for customizable arch height and metatarsal pad height. In one example, the arch support 30 and metatarsal support 32 both comprise bubble chambers 26 and are manufactured from the same elastomer as the primary body 12 of the insole 10.

The arch support 30 and metatarsal support 32 may be integral with the body 12 of the insole 10, as shown in FIGS. 2-5B. When integral with the body 12 of the insole 10, the arch support 30 and the metatarsal support 32 are not separable from, and are contiguous with, the insole 10. The supports 30, 32 may also be separable from the body 12 of the insole 10. In such cases, the body 12 of the insole 10 is adapted or configured to receive or mate with the separable arch support 30 and/or metatarsal support 32. For example, the arch support 30 and/or metatarsal support 32 can be configured to nest within mating structures on the body 12 with, for example and without limitation, a slip-fit, friction-fit, snap-fit, or another structure, and/or using an adhesive, hook and loop fasteners, or any other suitable fittings and/or fasteners.

The separable supports 30, 32 may be independently manufactured from the same material as the insole body 12, or from different materials. For example and without limitation, the arch support 30 and the metatarsal support 32 can be independently manufactured from a solid layer of the elastomer of the insole body 12. The supports 30, 32 can also comprise additional polymer and/or thermoplastic compositions, such as a foamed polymer. The foamed polymer may comprise EVA.

In some examples, the insole 10 may comprise both a separable arch support 30 and separable metatarsal support 32. The separable supports 30, 32 may be manufactured from the same material as the insole body 12 or from different materials. Further, the body 12 can comprise sections, such as openings or spaces, configured to receive the separate supports 30, 32. In some examples, the supports 30, 32 can be formed from multiple inserts configured to be connected together to form the support 30, 32. For example, the arch support 30 can comprise a first insert comprising a rigid support and/or bubble chambers, a second insert comprising a rigid support and bubble chambers, and/or a third insert comprising a rigid support and/or bubble chambers. The bottom of the first insert can be configured to receive the second insert and/or the third insert, such that when the inserts are connected together, additional support for the foot is provided. The user can decide whether to use multiple inserts (e.g., the first, second, and third inserts), one insert (e.g., only the first insert), or no inserts with the insole 10 based on the therapeutic needs of the patient. The second and/or third insert may be manufactured from the same material as the insole body 12 and/or first insert or from different materials.

In some examples, the insole 10 further comprises a supportive ridge 34 configured to provide additional stability for peripheral portions of the patient's foot. The supportive ridge 34 may extend from the top surface 14 of the body 12 and may extend about at least a portion of a periphery of the insole 10. The supportive ridge 34 may be in any suitable configuration, size, or shape. For example, the ridge 34 can be a rounded, elongated structure extending about the periphery of the insole 10. In some examples, the supportive ridge 34 comprises a plurality of concentric ridges about at least a portion of the periphery of the insole 10. For example, the insole 10 can comprise an outer ridge, an inner ridge, and/or a middle ridge about the periphery of the insole 10. The supportive ridge 34 may be a single continuous ridge extending about the periphery of the insole 10. Alternatively, the supportive ridge 34 may be made up of a plurality of segments 36 arranged around the periphery of the insole 10 to provide sufficient support for the foot. The support ridge 34 and/or segments 36 may be made from the same elastomer as the rest of the insole 10. The ridge 34 and/or segments 36 may be solid or hollow to achieve a desirable level of support for the foot. In some examples, the insole 10 can be trimmed for larger or shorter feet, and to appropriately tailor the anatomical portions of the insole 10 to a specific patient's foot. As such, supportive ridge 34, when present, may be trimmed away to match the features of the insole 10 to a patient's foot. In some examples, in order to facilitate trimming away portions of the ridges 34 and/or insole 10, the ridges 34 can comprise perforated portions or perforated lines. The perforated portions or perforated lines can be a guide for trimming or cutting the insole 10 to remove certain segments 36 of the ridges 34 and to conform the insole 10 to a desired size and/or shape.

In some examples, the insole 10 further comprises peripheral bubble chambers 38, similar in structure to the previously described bubble chambers 18, configured to provide support for peripheral portions of the patient's foot. For example, as shown in FIGS. 2-5B, the peripheral bubble chambers 38 are elongated structures having a substantially rectangular base extending from the top surface 14 of the body 12. The peripheral bubble chambers 38 are arranged adjacent to the supportive ridge 34 around the periphery of the insole 10. In some examples, the peripheral bubble chambers 38 are arranged in a single line around the periphery of the insole 10, as shown in FIGS. 2-5B. In other examples, the insole 10 can include additional peripheral bubble chambers 38 at selected portions of the insole 10 to provide increased support for specific portions of the patient's foot. In some examples, the insole 10 can comprise multiple rows of peripheral bubble chambers 38 arranged about the periphery of the insole 10. If needed, the peripheral bubble chambers 38 provide support for the peripheral portions of the patient's foot. If the peripheral bubble chambers 38 are not needed (e.g., the peripheral portions of the patient's foot do not require additional support) and/or if peripheral portions of the patient's foot are injured, the peripheral bubble chambers 38 can be deflated, as described in connection with FIG. 6A.

The insoles 10 described herein may be manufactured by any useful method, such as by 3D printing, molding of top and bottom portions of the insole 10, as in the case of bubble wrap, by molding a top layer over a shaped mold to form the upper profile of the insole, and applying and adhering a flat, bottom layer over the top layer, thereby trapping air in the formed bubble chambers 18. Layers of the insole body 12 can be laminated by any method, such as by heat or solvent welding, or by use of an adhesive. If the manufacture process, such as the 3D printing or lamination process, and therefore sealing of bubble chambers 18, is done under pressure of greater than one atmosphere, the bubble chambers 18 can be pressurized. Likewise, if the manufacture process, such as the 3D printing or lamination process, and therefore sealing of bubble chambers 18, is done under an atmosphere different from air, different gas mixtures can be introduced into the bubble chambers 18. The bubble chambers 18 also can be filled with any suitable liquid during formation.

Footwear Article

The insole 10 is configured to be placed in and/or integrally formed with a footwear article. As previously described, as used herein, a "footwear article" or an "article of footwear" is a covering for the foot comprising a plantar sole and an upper. The upper covers at least a portion of the dorsal side of the foot, and holds the sole in place on the plantar side of the foot. Footwear articles include, without limitation: shoes; boots; sandals; slides; sneakers; walking cast; surgical shoes; slippers; or clogs. The footwear article can also include a sock or stocking including portions of the insole 10. An "upper" is any structure that passes over the dorsal side of the foot or toes in a footwear article and holds the sole and insole 10 in place on the plantar surface of the foot. In some examples, as described herein, an upper may be an optionally adjustable strap or band as is found in sandals and slides, where the strap or band may comprise a hook and loop or a buckle fastener, as are common in footwear.

Figure 7:
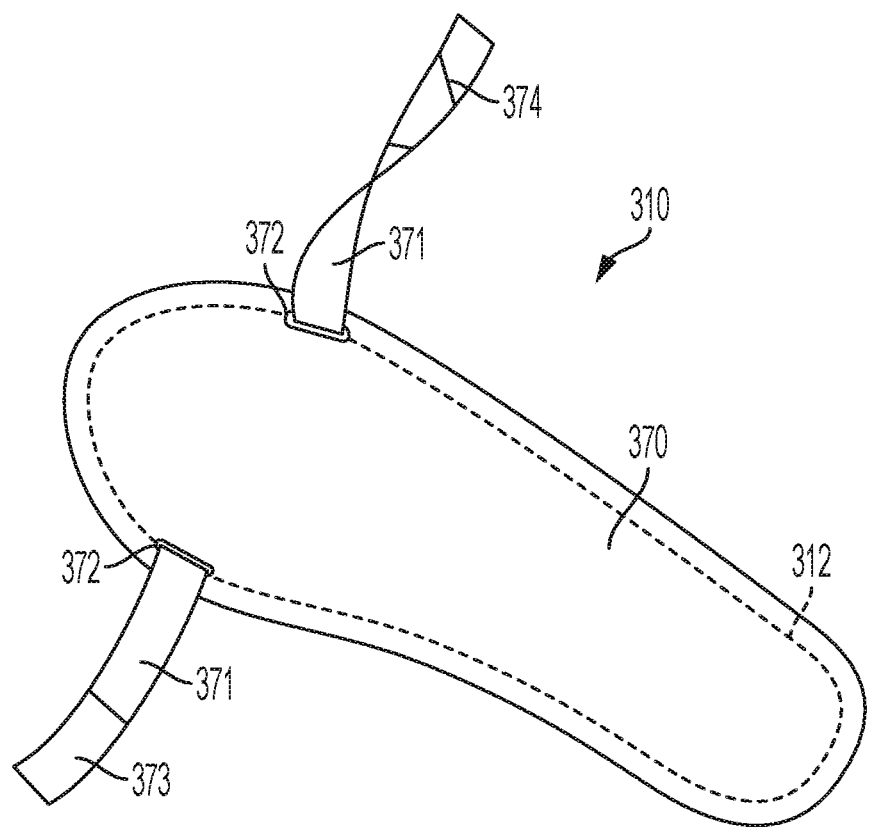
FIG. 7 is a footwear article for use with an insole for offloading injuries on an area of a plantar surface of a patient's foot, according to an aspect of the present disclosure.

FIG. 7 depicts schematically a sandal-type footwear article 310, for supporting any of the previously described insoles 10. In some examples, the footwear article 310 is waterproof and can be worn while bathing, swimming, or, for example, in the shower. The footwear article 310 comprises a sole 370. The sole 370 is a typical sandal sole, being rigid, or having suitable flexibility for walking. The sole 370 may be manufactured, for example, at least in part from a foamed or thermoplastic polymer composition such as EVA, leather, and/or rubber, as are broadly-known in the shoe making and sandal making arts. The phantom line 312 shows the location of placement of an insole 10 as described herein over the sole 370. Straps 371 forming the upper portion of the footwear article 310 are depicted passing through openings 372 into or through the sole 370, e.g., according to standard methods for affixing straps to or through a sandal. The strap 371 can be a single strap passing through the sole 370 or two straps, each anchored to the sole 370, e.g., mechanically, or by use of adhesive. The footwear article 310 may further comprise a hook-and-loop fastener system (e.g., VELCRO®), with a hook portion 373 at one end of the straps 371, and a loop portion 374 at another end of the straps 371. As will be appreciated by one skilled in the art, the insole 10 of the present disclosure can be placed over the sole 370, and the straps 371 are joined using the hook and loop fastener 373 and 374 around a patient's foot. In alternate aspects of the invention, the straps 371 may include more than two straps, and may fasten by any suitable closure, such as a buckle, snaps, etc. The straps 371 may be permanently joined, with no fastener or adjustment mechanism, as a single upper for holding the foot in place (e.g., a slide). In other examples, the upper of the footwear article 310 may take any useful shape and configuration, as are used for articles of footwear, such as shoe, sandal, slide, boot, etc., and can utilize any suitable fastening method, such as tie, buckle, snap, hook-and-loop, or fixed (e.g., loafer) configurations as are broadly-known.

Injury Treatment Kit

According to another aspect of the disclosure, a kit for treating and/or protecting injuries to a plantar surface of a patient's foot is provided. The kit comprises at least the insole 10 according to any aspect provided herein. The kit also may include a footwear article, such as the footwear article 310 shown in FIG. 7, into which the insole 10 inserts or is otherwise affixed. As previously described, the footwear article 310 can comprise a sandal, slide, dress shoe, boot, or any other form of footwear, as are known in the art. To mark a patient's foot in order to align the insole 10 to a patient's foot, the kit also optionally includes a marker, such as a pen. In some examples, the marker comprises transferrable ink, dye, or other material that can be applied to locations on a patient's foot and transferred to the insole 10. In other examples, especially if the insole 10 is clear or translucent, the insole 10 can be held against the patient's foot. A user may use the marker to trace or otherwise identify injured portions of the foot on the rear surface 16 of the insole body 12. The user can then deflate bubble chambers 18 on identified portions of the insole 10 to customize the insole 10 for a particular patient and tissue injury.

Figure 9:
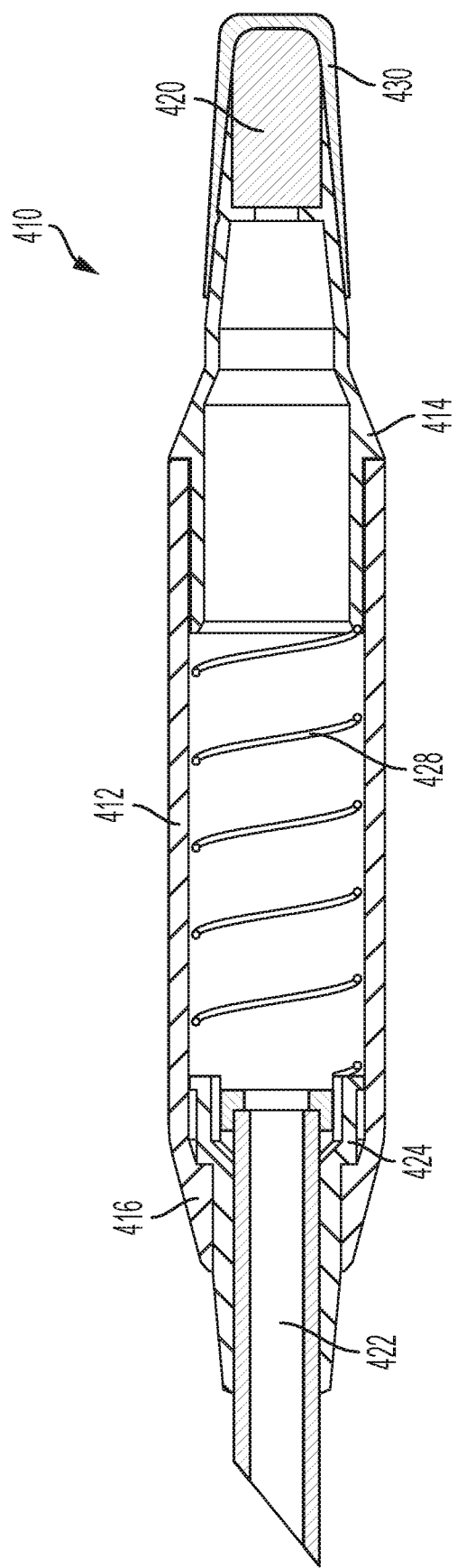
FIG. 9 is a cross-sectional view of a dual-purpose marker and piercing tool, according to an aspect of the disclosure.

In some aspects, a piercing device for piercing the bubble chambers 18 may be included in the kit. A portion of the piercing device 275 is shown in FIG. 6A. Another example of a piercing device 275, referred to herein as a dual-purpose marking and piercing device, is shown in FIG. 9. The piercing device 275 may be a bare needle, a hole punch, a hollow needle (see needle 277 of FIG. 6A), pin, or nail. The handle may have any useful shape to allow a user to safely and effectively grip the sharp portion of the piercing device 275 to deflate or "pop" the described bubble chambers 18. The sharp portion of the piercing device 275 may be a solid, such as, without limitation, a lancet, blade, stylet, pin, nail, or needle, or may be hollow, as in a hypodermic or biopsy needle, or a larger diameter hole punch. The piercing device 275 also may be a mechanical device, such as a spring-loaded needle or hole punch, similar to spring loaded biopsy devices as are available. In some examples, it may be preferable to remove a core of material from the wall of a bubble chamber 18 to allow for complete and rapid deflation of the bubble chamber 18.

In some examples, the kit comprises a dual-purpose marker and piercing device, such as the device 410, shown in FIG. 9. The dual purpose device 410 comprise a cylindrical body 412 having a first end 414 and an opposing second end 416. A marker 420 is provided at the first end 414 of the body 412. The dual purpose device 410 may further comprise a piercing needle 422 mounted to a needle hub 424. The needle 422 and hub 424 can be provided at the second end 416 of the body 412. In some examples, the piercing needle 422 is initially provided in a retracted position. In order to extend the needle 422, a user can press a distal end of the hub 424 against an object, such as the bubble chamber 18. In response to applied pressure to the hub 424, a spring 428 releases, thereby biasing the needle 422 and/or hub 424 in a distal direction to an extended position, as shown in FIG. 9. In other examples, the device 410 can comprise a release tab or release button for releasing the spring 428, as are known in the art. In other examples, the piercing needle 422 may not be retractable. The piercing needle 422 may be any suitable sharp device, as described herein, such as, without limitation, a solid needle, a hollow-bore needle, a blade or lancet, or a hollow punch. The dual purpose device 410 may further comprise a cap 430 for capping the marker 420 at the first end 414 of the body 412 and/or for capping the piercing needle 422 at the second end 416 of the device 410. The caps 430 are removable and may be friction fit, snap-on, screw-on, or attachable to the body 412 in any acceptable manner. The piercing needle 422 and needle hub 424 optionally may comprise a locking mechanism that locks the needle 422 in an extended position when in use and/or in a shielded position when retracted.

Figure 8A:
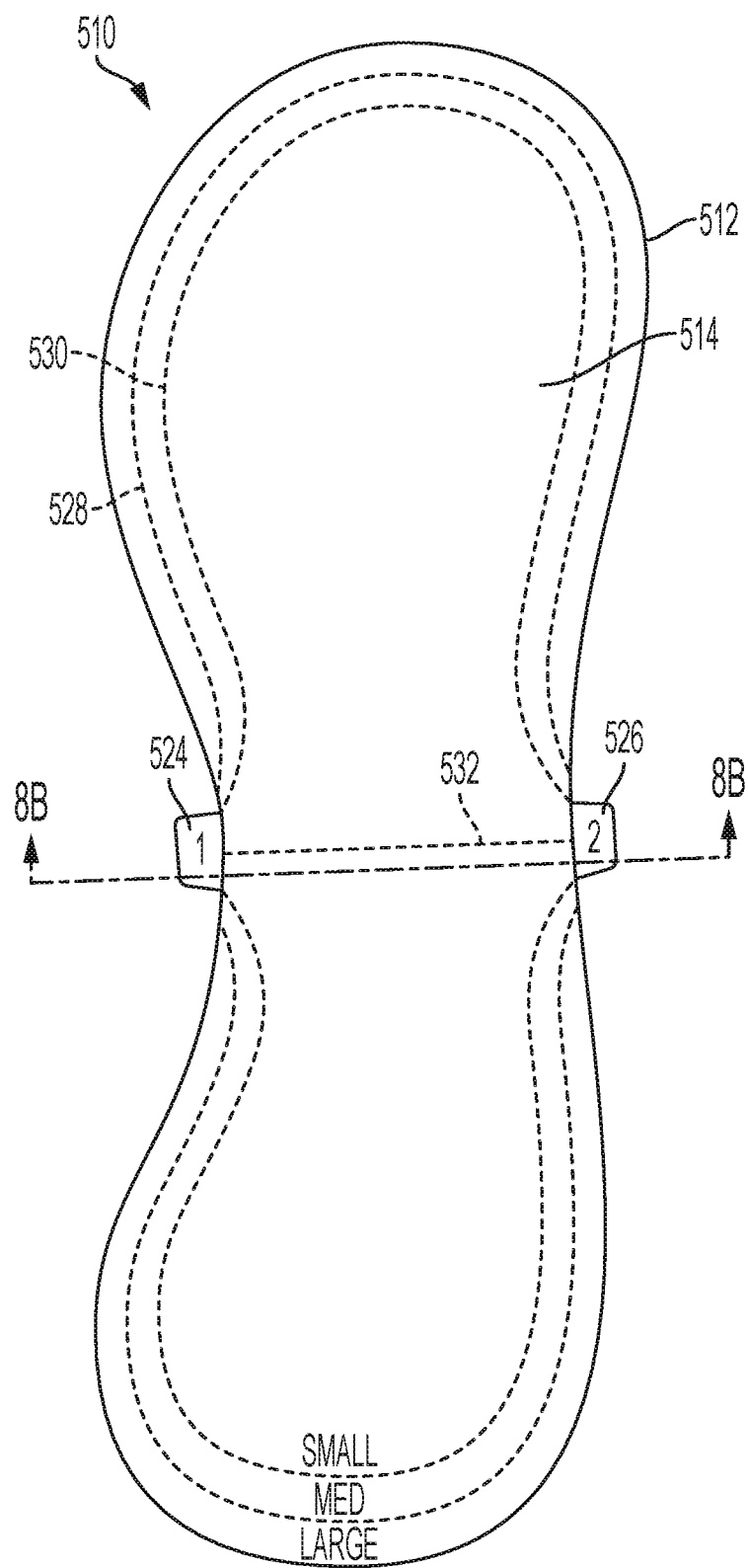
FIG. 8A is a schematic drawing of an adhesive device for mounting an insole for offloading injuries on an area of a plantar surface of a patient's foot to a sole of a footwear article, according to an aspect of the disclosure.
Figure 8B:
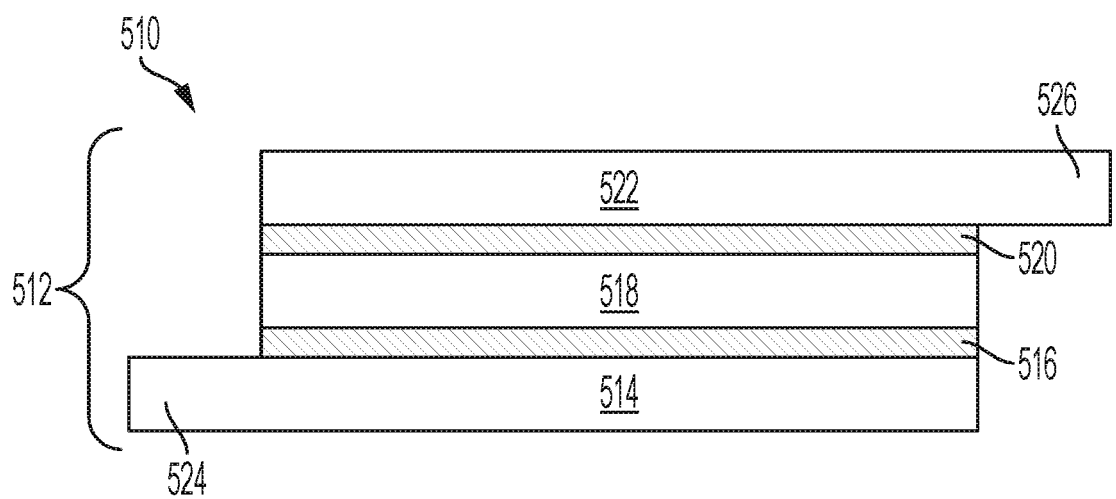
FIG. 8B is a schematic cross-sectional view of the adhesive device of FIG. 8A.

In some examples, the kit further comprises an adhesive for affixing the insole 10 to the sole 370 of the footwear article 310. The adhesive may be a liquid adhesive, but also can be in the form of two-sided tape or a customized adhesive device 510. One aspect of a customizable adhesive device 510 is depicted in FIG. 8A, which facilitates use of the insole 10 as described herein. As depicted in FIG. 8A, a body 512 of the adhesive device 510 is shaped as an insole. Referring to FIG. 8B, the body 512 comprises a first protective layer 514 that can be formed from any suitable material, such as paper, cardboard, a polymeric film, etc. A first adhesive layer 516 is provided over the first protective layer 514. Optionally, the first protective layer 514 comprises a release layer and/or a removable layer, which can be removed from the first adhesive layer 516, so that the adhesive layer can be connected to the insole 10 and/or sole 370 of the footwear article 310. The first protective layer 514 can comprise a quick-release coating contacting the adhesive layer 516 and configured to be easily removed from the adhesive layer 516 without substantial force and/or without reducing adhesive qualities of the adhesive layer 516. Over the first adhesive layer 516 is a middle layer 518, which can be any suitable material, such as paper, cardboard, a polymeric film, etc. A second adhesive layer 520 is disposed over the middle layer 518. A second protective layer 522 is disposed over the second adhesive layer 520. Referring to both FIGS. 8A and 8B, the device 510 further comprises a first tab 524 that is integral with or attached to the first protective layer 514, and a second tab 526 that is integral with or attached to the second protective layer 522. The tabs 524, 526 are used to facilitate grasping of and removal of the first protective layer 514 and the second protective layer 522, respectively. Referring to FIG. 8A, traces 528, 530 are provided as a guide to facilitate cutting the adhesive device 510 to size. Alternatively, the traces 528, 530 are frangible perforations that facilitate removal of materials peripheral to the perforations. A break 532 that can be a complete cut or frangible perforations is depicted in the second protective layer 522. The break 532 also splits each tab 524, 526 and can be used to remove only half of the protective layer(s) 514, 522 if desired. The adhesive can be any useful adhesive that can be used to affix the insole 10 to the sole 370 of the footwear article 310 (e.g., any adhesive used commonly for double-sided tape and/or medical adhesives). Where present, the release layer can be any useful material that will adhere to the adhesive, and which can be used to facilitate release of the protective layers 514, 522 from the respective adhesive layers 516, 520.

The embodiments have been described with reference to various examples. Modifications and alterations will occur to others upon reading and understanding the foregoing examples. Accordingly, the foregoing examples are not to be construed as limiting the disclosure.

Preferred and non-limiting aspects or embodiments of the present invention will now be described in the following numbered clauses:

Clause 1: An insole for offloading injuries on an area of a plantar surface of a patient's foot, comprising: a body having a shape corresponding to the plantar surface of the patient's foot comprising a top surface and a bottom surface; and at least one supportive, deformable, deflatable bubble chamber extending from the top surface of the body, the at least one bubble chamber being configured to be deflated to relieve pressure on the plantar surface of the patient's foot.

Clause 2: The insole of clause 1, comprising a plurality of the at least one supportive, deformable, deflatable bubble chambers, wherein at least one of the bubble chambers is independently deflatable.

Clause 3: The insole of clause 1 or clause 2, wherein the at least one supportive, deformable, deflatable bubble chamber is positioned in a distal metatarsal head portion of the insole to relieve pressure on at least a portion of the plantar surface of the patient's foot over a distal metatarsal head.

Clause 4: The insole of clause 3, comprising a row of at least five of the supportive, deformable, deflatable bubble chambers, wherein each bubble chamber is located at a different distal metatarsal head portion of the insole.

Clause 5: The insole of clause 3 or clause 4, comprising from 2 to 10 supportive, deformable, deflatable bubble chambers located over each distal metatarsal head portion of the insole.

Clause 6: The insole of any of clauses 1-5, wherein the at least one supportive, deformable, deflatable bubble chamber is positioned in a heel or calcaneus bone portion of the insole to relieve pressure on at least a portion of the heel or the patient's foot over the calcaneus bone.

Clause 7: The insole of clause 6, comprising from 2 to 100 supportive, deformable, deflatable bubble chambers in the heel or calcaneus bone portion of the insole.

Clause 8: The insole of any of clauses 1-5, wherein the at least one supportive, deformable, deflatable bubble chamber is positioned in a plantar fascia portion of the insole to relieve pressure on at least a portion of the plantar fascia.

Clause 9: The insole of any of clauses 1-8, further comprising at least one solid support member extending from the top surface of the body positioned in an arch portion of the insole, wherein the at least one solid support member comprises a foam or thermoplastic support member.

Clause 10: The insole of any of clause 9, wherein the at least one supportive, deformable, deflatable bubble chamber is positioned in the arch portion of the insole over the at least one solid support member.

Clause 11: The insole of clause 9, comprising a plurality of supportive, deformable, deflatable bubble chambers positioned in the arch portion of the insole over the at least one solid support member.

Clause 12: The insole of clause 11, wherein at least one of the plurality of bubble chambers is stacked over another of the bubble chambers.

Clause 13: The insole of any of clauses 1-12, further comprising at least one solid support member located in a metatarsal portion of the insole.

Clause 14: The insole of clause 13, wherein the at least one solid support member comprises a foam or thermoplastic support member.

Clause 15: The insole of clause 13, comprising a plurality of supportive, deformable, deflatable bubble chambers located in the metatarsal portion of the insole over the at least one solid support member.

Clause 16: The insole of clause 15, wherein at least one of the plurality of bubble chambers is stacked over another of the bubble chambers.

Clause 17: The insole of clause 1, wherein the at least one bubble chamber comprises a single supportive, deformable, deflatable bubble chamber positioned in a metatarsal portion of the insole.

Clause 18: The insole of any one of clauses 1-15, further comprising a first metatarsal support member configured to fit a metatarsal portion of the insole, wherein the first metatarsal support member is separable from the insole.

Clause 19: The insole of clause 18, further comprising a second metatarsal support member configured to stack over at least a portion of the first metatarsal support member and separable from the first metatarsal support member.

Clause 20: The insole of clause 19, further comprising a third metatarsal support member configured to stack over at least a portion of the second metatarsal support member, and separable from the second metatarsal support member.

Clause 21: The insole of clause 20, wherein the first, second, and/or third metatarsal support members comprise deflatable chambers.

Clause 22: The insole of any of clauses 1-21, further comprising at least one supportive ridge extending from the top surface of the body and extending about at least a portion of a periphery of the insole.

Clause 23: The insole of clause 22, wherein the at least one supportive ridge comprises a plurality of concentric ridges about at least a portion of the periphery of the insole.

Clause 24: The insole of any of clauses 1-23, further comprising a cushioning layer of an elastomeric material over at least a portion of the top surface of the body.

Clause 25: A kit comprising the insole of any one of clauses 1-24.

Clause 26: The kit of clause 25, further comprising a perforation tool configured to cut a wall of the at least one bubble chamber of the insole.

Clause 27: The kit of clause 26, wherein the perforation tool comprises at least one of a blade, a lancet, a pin, a needle, a hollow needle, or a hole punch.

Clause 28: The kit of clause 23 or clause 24, further comprising a marker.

Clause 29: The kit of clause 25, further comprising a dual-purpose marking and perforation tool, the dual-purpose tool comprising at least one retractable member and a marker.

Clause 30: The kit of any one of clauses 25-29, further comprising an adhesive and/or an adhesive device for mounting the insole to a sole of a footwear article.

Clause 31: The kit of clause 30, wherein the adhesive and/or adhesive device comprises at least one of double-sided tape or an adhesive device comprising adhesive on two major sides thereof.

Clause 32: The kit of clause 30, wherein the adhesive device comprises: a middle layer having two major surfaces; adhesive over the two major surfaces of the middle layer; and a removable protective layer over the adhesive.

Clause 33: The kit of clause 32, wherein the removable protective layer of the adhesive device comprises a quick-release coating contacting the adhesive.

Clause 34: An article of footwear comprising a sole comprising a top surface and a bottom surface, an upper connected about a periphery of the top surface of the sole defining an interior of the article of footwear, and the insole of any of clauses 1-24 positioned in the interior of the article of footwear with the bottom surface of the insole contacting the top surface of the sole.

Clause 35: Use of an insole of any of clauses 1-24, to relieve pressure on at least a portion of the plantar surface of the foot of the patient.

Clause 36: The use of the insole in clause 35, for treatment of at least one of a wound, graft, or other damage, lesion, or defect on the plantar surface of the patient's foot.

Clause 37: A method of relieving pressure on a portion of a plantar surface of a foot of a patient, the method comprising: placing the insole of any of clauses 1-24 in an article of footwear; deflating the at least one bubble chamber of the insole, wherein the at least one bubble chamber is located at a position on the insole corresponding to the portion of the patient's plantar surface requiring pressure relief; and positioning the patient's foot in the article of footwear such that the portion of the patient's plantar surface in need of pressure relief is over the deflated at least one bubble chamber.

Clause 38: The method of clause 37, wherein the method relieves pressure from at least one of a wound, graft, or other damage, lesion, or defect on the plantar surface of the patient's foot.

The invention claimed is:

1. An insole for offloading injuries on an area of a plantar surface of a patient's foot, comprising:
   a body having a shape corresponding to the plantar surface of the patient's foot comprising a top surface and a bottom surface;
   at least one solid support member comprising a foam or thermoplastic material extending from the top surface of the body and disposed in an arch portion of the insole, wherein a periphery of a bottom of the at least one solid support member is surrounded by portions of the top surface of the body; and
   a plurality of supportive, deformable, deflatable bubble chambers extending from the top surface of the body, the plurality of bubble chambers being sealed and fluidly isolated from one another, wherein at least one of the plurality of bubble chambers is configured to be independently deflated to relieve pressure on the plantar surface of the patient's foot and another of the plurality of bubble chambers is positioned over the at least one solid support member.

2. The insole of claim 1, wherein the plurality of supportive, deformable, deflatable bubble chambers comprises at least one bubble chamber positioned in a distal metatarsal head portion of the insole to relieve pressure on at least a portion of the plantar surface of the patient's foot over a distal metatarsal head.

3. The insole of claim 2, wherein the plurality of bubble chambers comprises a row of at least five of the supportive, deformable, deflatable bubble chambers, wherein each bubble chamber of the row is located at a different distal metatarsal head portion of the insole.

4. The insole of claim 1, wherein the plurality of supportive, deformable, deflatable bubble chambers comprises at least one bubble chamber is positioned in a plantar fascia portion of the insole to relieve pressure on at least a portion of the plantar fascia.

5. The insole of claim 1, wherein at least one of the plurality of supportive, deformable, deflatable bubble chambers is stacked over another of the bubble chambers.

6. The insole of claim 1, further comprising at least one additional solid support member located in a metatarsal portion of the insole configured to support a portion of the plantar surface of the patient's foot over at least one metatarsal head bone of the patient.

7. The insole of claim 6, wherein some of the plurality of supportive, deformable, deflatable bubble chambers are located in the metatarsal portion of the insole, and wherein at least one of the plurality of bubble chambers is located over the at least one additional solid support member.

8. The insole of claim 1, further comprising at least one supportive ridge extending from the top surface of the body and extending about at least a portion of a periphery of the insole, wherein the at least one supportive ridge is spaced apart from the plurality of supportive, deformable, deflatable bubble chambers by a portion of the top surface of the body.

9. The insole of claim 1, further comprising a cushioning layer of an elastomeric material over at least a portion of the top surface of the body.

10. A kit comprising the insole of claim 1.

11. The kit of claim 10, further comprising a perforation tool configured to cut a wall of the plurality of bubble chambers of the insole.

12. The kit of claim 10, further comprising a dual-purpose marking and perforation tool, the dual-purpose tool comprising at least one retractable member and a marker.

13. The kit of claim 10, further comprising an adhesive and/or an adhesive device for mounting the insole to a sole of a footwear article, wherein the adhesive device comprises:
   a middle layer having two major surfaces;
   adhesive over the two major surfaces of the middle layer; and
   a removable protective layer over the adhesive.

14. A method of relieving pressure on a portion of a plantar surface of a foot of a patient, the method comprising:
   placing the insole of claim 1 in an article of footwear;
   deflating at least one of the plurality of bubble chambers of the insole located at a position on the insole corresponding to the portion of the patient's plantar surface requiring pressure relief; and
   positioning the patient's foot in the article of footwear such that the portion of the patient's plantar surface in need of pressure relief is over the deflated at least one bubble chamber.

15. The insole of claim 1, wherein one or more of the plurality of the supportive, deformable, deflatable bubble chambers is positioned in each of the following portions of the insole: a toe portion of the insole, a distal metatarsal head portion of the insole, a medial arch portion of the insole, a metatarsal portion of the insole, a heel portion of the insole, and a plantar fascia insertion and tendon portion of the insole.

16. The insole of claim 15, wherein the plurality of the supportive, deformable, deflatable bubble chambers are configured to provide support for the following portions of the patient's foot: a toe of the foot, a distal metatarsal head of the foot, a medial arch of the foot, a metatarsal portion of the foot, a heel of the foot, and a plantar fascia of the foot.

17. The insole of claim 1, wherein at least one of the plurality of the supportive, deformable, deflatable bubble chambers has a circular cross-sectional shape and is positioned to support a heel of the patient.

18. The insole of claim 8, wherein the plurality of supportive, deformable, deflatable bubble chambers comprises a plurality of peripheral bubble chambers positioned adjacent to the at least one supportive ridge and around a periphery of the insole.

19. The insole of claim 8, wherein the at least one supportive ridge comprises at least one perforated line for guiding trimming or cutting the insole to remove one or more segments of the at least one supportive ridge.

20. The insole of claim 19, wherein the at least one perforated line is positioned to conform the insole to a desired size.

\* \* \* \* \*

UNITED STATES PATENT AND TRADEMARK OFFICE
CERTIFICATE OF CORRECTION

PATENT NO. : 12,161,189 B2  
APPLICATION NO. : 17/277916  
DATED : December 10, 2024  
INVENTOR(S) : Jeffrey A. Gusenoff Page 1 of 1

It is certified that error appears in the above-identified patent and that said Letters Patent is hereby corrected as shown below:

In the Claims

Column 16, Line 8, Claim 4, delete "chamber is" and insert -- chamber --

Signed and Sealed this
Eighteenth Day of February, 2025

Coke Morgan Stewart
*Acting Director of the United States Patent and Trademark Office*